Dec. 6, 1955  G. H. DAVIS  2,725,733
BEVERAGE GLASS
Filed June 30, 1947

Inventor
George Howlett Davis
By Barthel & Bugbee
Attorneys

United States Patent Office 2,725,733
Patented Dec. 6, 1955

2,725,733
BEVERAGE GLASS

George Howlett Davis, Detroit, Mich., assignor of fifty per cent to Detroit Macoid Corporation, Detroit, Mich., a corporation of Michigan Application June 30, 1947, Serial No. 758,009

1 Claim. (Cl. 65—66)

This invention relates to containers, and in particular to beverage glasses.

One object of this invention is to provide a double-walled beverage glass which will insulate the contents from the surrounding atmosphere and will therefore maintain the contents in a cooler condition for a longer period of time than in an ordinary glass and which will also eliminate the condensation occurring on the outside of an ordinary glass.

Another object is to provide a double-walled beverage glass wherein the inner and outer glass members are joined at a relatively thin rim portion, so as to facilitate drinking from the glass.

Another object is to provide a double-walled beverage glass wherein the outer wall of the inner glass member can be coated with a decorative design which is protected from the wear and tear brought about by washing or using the glass, thereby enabling cheaper or more fragile materials to be used for the decoration than can be used for ordinary glasses.

Another object is to provide a double-walled beverage glass, as set forth in the preceding objects wherein one of the glass members is provided with bottom projections positioned to engage the bottom of the other glass member so as to facilitate manufacture as well as to give greater support for the inner glass member and to strengthen it against the shock of dropping ice cubes or the like into it.

Another object is to provide a double-walled beverage glass, as set forth in the preceding objects, wherein the space between the outer and inner glass members provides a dead air space which increases the insulation and decreases the heat transmission through the sides of the glass.

Another object is to provide a double-walled beverage glass or tumbler, wherein the inner tumbler has an outwardly extending rim over-hanging the upper edge of the rim of the outer tumbler, thereby suspending the inner tumbler from the rim of the outer tumbler and particularly facilitating the use of molded plastic tumblers instead of glass.

Other objects and advantages of the invention will become apparent during the course of the following description of the accompanying drawings, wherein.

Figures 1, 2, 3, 4:
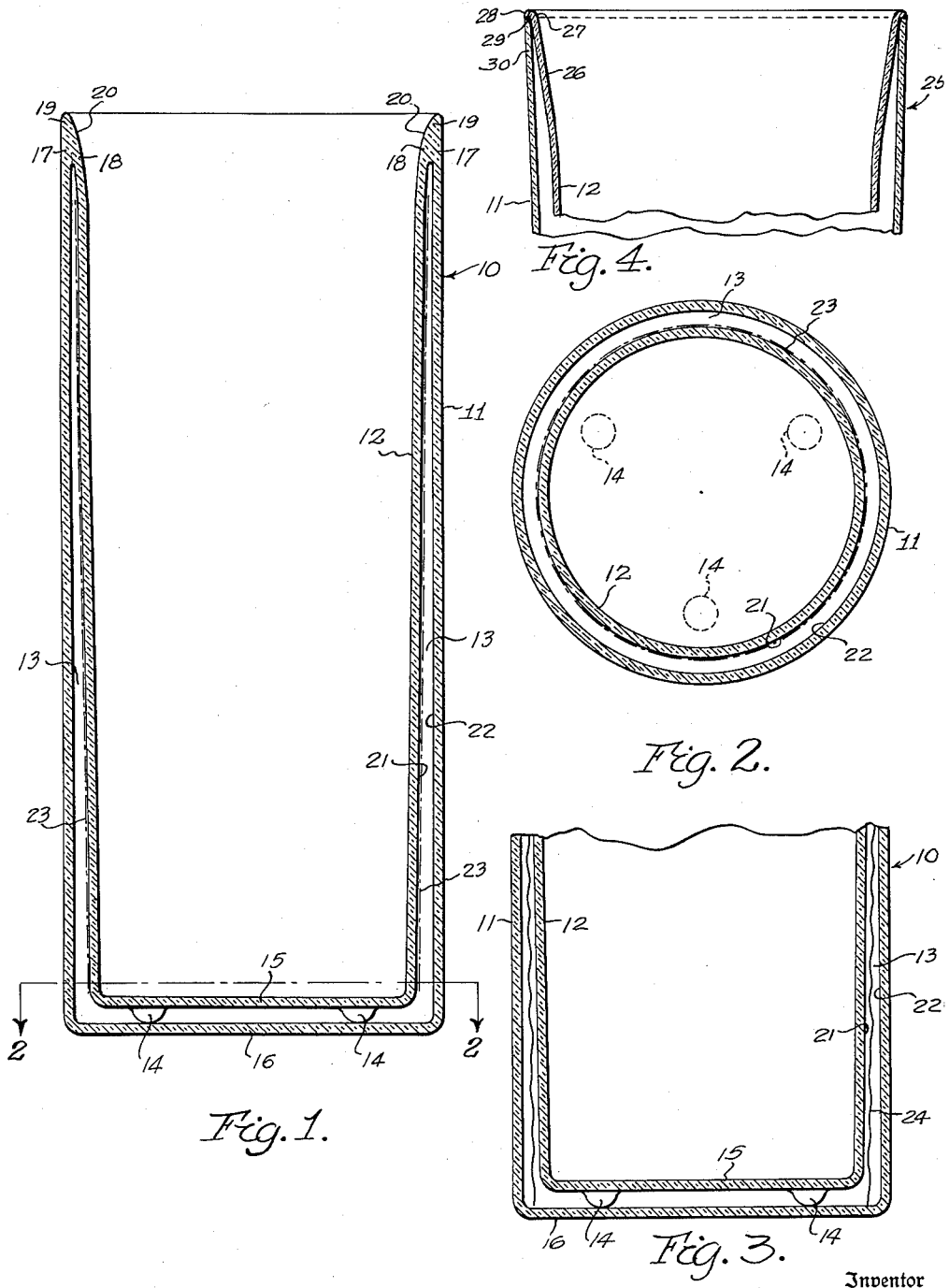
Figure 1 is a central vertical section through a double-walled beverage glass according to a preferred form of the present invention.
Figure 2 is a horizontal section taken along the line 2—2 in Figure 1.
Figure 3 is a central vertical section through the lower portion of a modification of the beverage glass shown in Figure 1.
Figure 4 is a fragmentary central vertical section through the upper portion of a further modification of the beverage glass shown in Figure 1.

Referring to the drawing in detail, Figures 1 and 2 show a double-walled beverage glass, generally designated 10, according to a preferred form of the invention as consisting generally of an outer glass member 11 of substantially frusto-conical shape and an inner glass member 12 separated from one another by a space 13. The space 13 is preferably a dead air space, it being found by experimenting that such a space gives a satisfactory insulating performance for ordinary purposes, but it will be understood that the space 13 may be partially or wholly evacuated, if desired.

The inner glass member 12 is optionally provided with projections or spacing elements 14 on the bottom thereof adapted to rest upon the bottom of the outer glass member 11. By this means, the bottom portions 15 and 16 of the two glass members 11 and 12 are spaced apart from one another and at the same time are given mutual support. They also serve to reduce breakage by strengthening the bottom 15 of the inner glass member 12 against the shock of ice cubes dropping into the glass, or against the pressure of implements used to press out the juice from certain fruits, such as limes, against the bottom of the glass. The projections 14 also serve to align the rim portions 17 and 18 of the outer and inner glass members 11 and 12 prior to their being united to one another, and this arrangement facilitates manufacture.

The combined rim 19 formed by the uniting of the outer and inner rim portions 17 and 18 is preferably further thinned during manufacture so that the resulting glass 10 has a relatively thin rim to facilitate drinking. The rim portion 18 of the inner glass member 12 is preferably flared outward as at 20 where it joins the outer rim portion 17. Since the rim portion 19 is ordinarily above the level of the liquid in the glass it does not require insulation, hence does not require the insulating space 13.

In uniting the glass members 11 and 12, the glass member 12 is placed inside the glass member 11 with the projections 14 engaging the bottom portion 16 of the outer glass member 11. With the glass members 11 and 12 held in suitable holders so that their positions are accurately maintained, an intensely hot flame is played upon their rim portions 17 and 18. Under the influence of this heat, the rim portions 17 and 18 soften and fuse together. The resulting rim 19, which is the combined rim for the two glasses, may be additionally thinned by applying a pressure roller or suitable dies thereto. The glass 10 is then annealed in a conventional manner or subjected to further heat treatment, whereby any strain will be either removed or distributed throughout the glass and thus rendered harmless.

In the use of the glass, it has been found that the double-walled glass of the present invention retains a mixture of ice and water twice as long at ordinary room temperature than if the same mixture is placed in a single walled glass. It is also found that the temperature in the double-walled glass of the present invention is as much as 8 to 10 degrees lower than in a single walled glass, thereby providing a cooler drink because of the lower heat-transmission through the double walls and dead air space between them.

Because of the effective insulation provided by the present invention, the condensation ordinarily occurring on the outside of a single walled glass is eliminated and along with it the unpleasant coldness of the ordinary glass. Since condensation is eliminated, the use of coasters or napkins is also made unnecessary.

The outer surface 21 of the inner glass member 12 or the inner surface 22 of the outer glass member 11 may be provided with a layer 23 of coating material, either partially or completely covering it, and serving not only as decoration but also as further insulation. The layer 23 may consist of relatively fragile paints, metal foil, or the like, since these are completely protected against abrasion or the action of the atmosphere or washing materials in the subsequent cleaning and handling of the glasses. The metal foil coating 23 is particularly efficient as an insulation coating while also serving a decorative purpose. At the same time, the cost of decoration in manufacture can be greatly reduced, since cheaper decorative materials can be employed which do not require the resistance to handling that unprotected and exposed decorative materials require.

The modification shown in Figure 3 is similar to the form of glass shown in Figure 1, except that an insulating and at the same time decorative member 24 is mounted loosely in the space 13 instead of being deposited upon or caused to adhere to the surfaces 21 or 22 as in Figure 1. The member 24 may consist for example of metal foil, such as aluminum foil, placed in the space 13. Such metal foil has a high heat-insulating value, hence keeps the liquid cool longer, and at the same time is very attractive in appearance.

In order to minimize the heat transfer due to convection as the result of air currents sweeping across the top surface of the liquid, it is preferable to make the glass 10 as small in diameter as is practical. This results in a rather tall, small-diameter glass for the maximum efficiency.

The modified beverage glass 25 shown in Figure 4 has outer and inner members or containers 11 and 12 similar to those shown in Figure 1. The containers 11 and 12, however, are preferably made of molded synthetic plastic material, and for this reason are substantially unbreakable.

The term "glass" is, of course, merely used in the generic sense as referring to a beverage container and not to the specific material of which the tumbler is made, which may or may not be the actual ceramic material known specifically as glass. The upper portion 26 of the inner container 12 is flared outward and at its rim 27 is provided with an outwardly extending flange 28 which overhangs the upper edge 29 of the rim 30 of the outer container 11. Thus, in this construction the inner container 12 is suspended by the flange 28 from the rim 30 of the outer container.

In the modification shown in Figure 4, as well as in the forms of the invention shown in Figures 1 to 3 inclusive, the projections 14 are optional and may be omitted entirely, especially when the containers 11 and 12 are made of plastic material. It will also be evident that the containers 11 and 12 in any form of the invention may be made of material other than glass, for example synthetic plastic material, and cemented or otherwise secured to one another.

What I claim is:

A beverage tumbler comprising a cup-shaped synthetic plastic outer container and a cup-shaped synthetic plastic inner container both of substantially frusto-conical shape, the flaring sidewalls of both containers being nearly parallel throughout the greater part of their height, the inner container mounted in spaced relationship within said outer container and the inner container having its upper portion flaring sharply outwardly toward said outer container into substantial engagment with the inner wall of said outer container at the rim thereof, the rim of said inner container at its extreme upper end having a very narrow flange extending substantially horizontally outwardly therefrom and providing therebeneath an annular shoulder resting upon and overhanging the upper end of the rim of said outer container but not extending therebeyond so as to provide a smooth joint at the rim, and a layer of adhesive material disposed between said annular shoulder and the upper end of said outer container, the inner and outer containers being completely spaced from each other except at the joint.

References Cited in the file of this patent
UNITED STATES PATENTS

| Number | Name | Date |
|---|---|---|
| 53,279 | Dithridge | Mar. 20, 1866 |
| 165,301 | Burkhard | July 6, 1875 |
| 481,544 | Arnold | Aug. 30, 1892 |
| 888,054 | Aschenbrenner | May 19, 1908 |
| 1,019,660 | Klett | Mar. 5, 1912 |
| 1,199,772 | Engel | Oct. 3, 1916 |
| 1,459,023 | Guest | June 19, 1923 |
| 1,525,567 | Cadby | Feb. 10, 1925 |
| 1,956,395 | Montgomery | Apr. 24, 1934 |
| 1,968,263 | Reuther | July 31, 1934 |
| 1,997,055 | Graefe | Apr. 9, 1935 |
| 2,051,446 | Ice | Aug. 18, 1936 |
| 2,070,672 | Moczala | Feb. 16, 1937 |
| 2,339,221 | Gulick | Jan. 11, 1944 |
| 2,448,589 | Gulick | Sept. 7, 1948 |